June 3, 1958 P. D. WURZBURGER 2,837,352
SWIVEL COUPLING WITH RESILIENT RING TO BIAS DETENT MEANS
Filed Nov. 8, 1954 4 Sheets-Sheet 1

INVENTOR.
Paul D. Wurzburger

BY Schramm and Knowles
Attorneys

June 3, 1958  P. D. WURZBURGER  2,837,352
SWIVEL COUPLING WITH RESILIENT RING TO BIAS DETENT MEANS
Filed Nov. 8, 1954  4 Sheets-Sheet 2
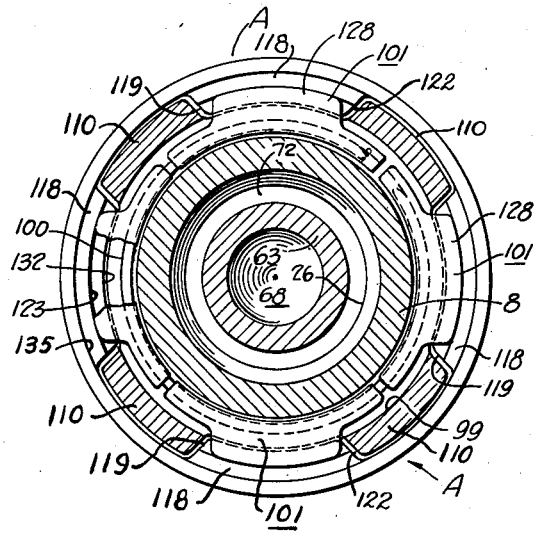
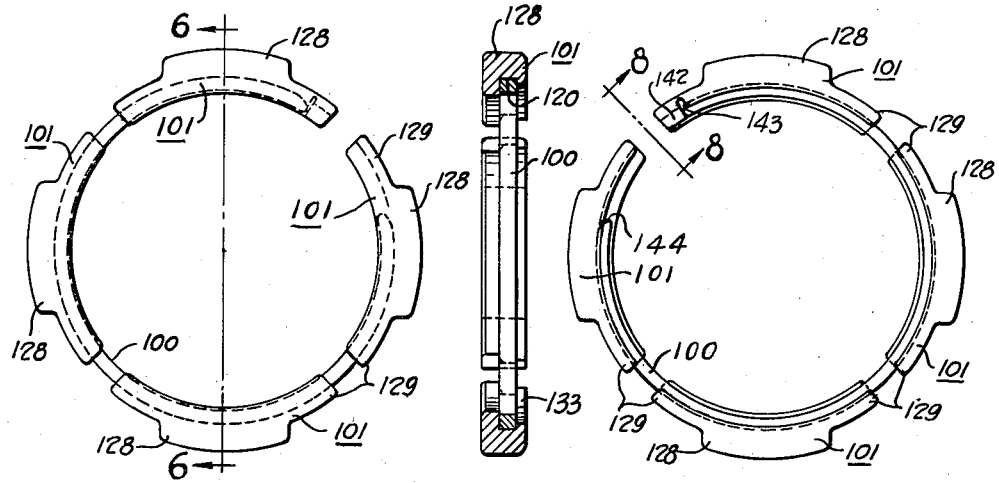
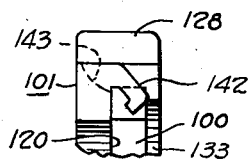
INVENTOR.
Paul D. Wurzburger
BY Schramm and Knowles
Attorneys

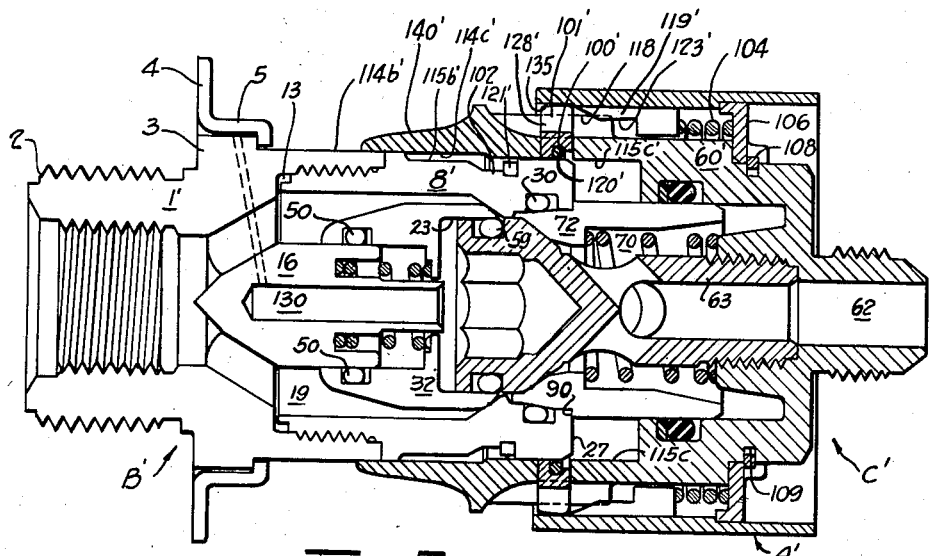
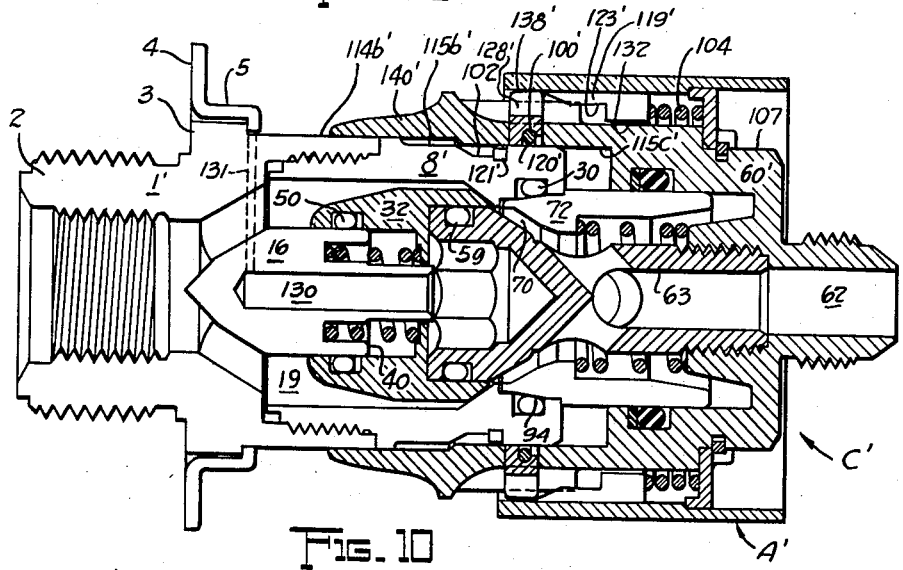
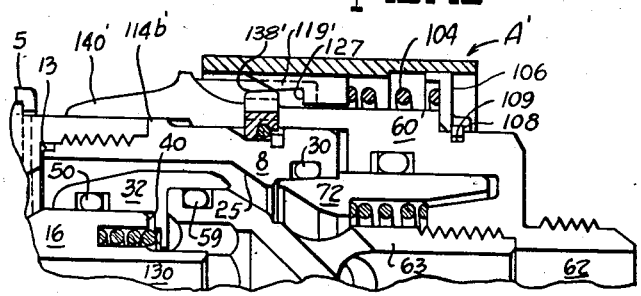

June 3, 1958
P. D. WURZBURGER
2,837,352
SWIVEL COUPLING WITH RESILIENT RING TO BIAS DETENT MEANS
Filed Nov. 8. 1954
4 Sheets-Sheet 4
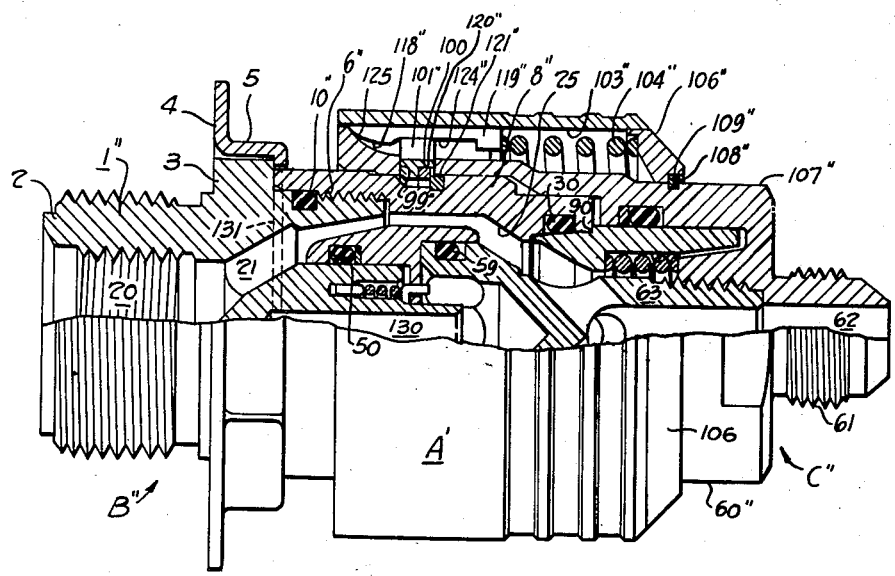
FIG. 12
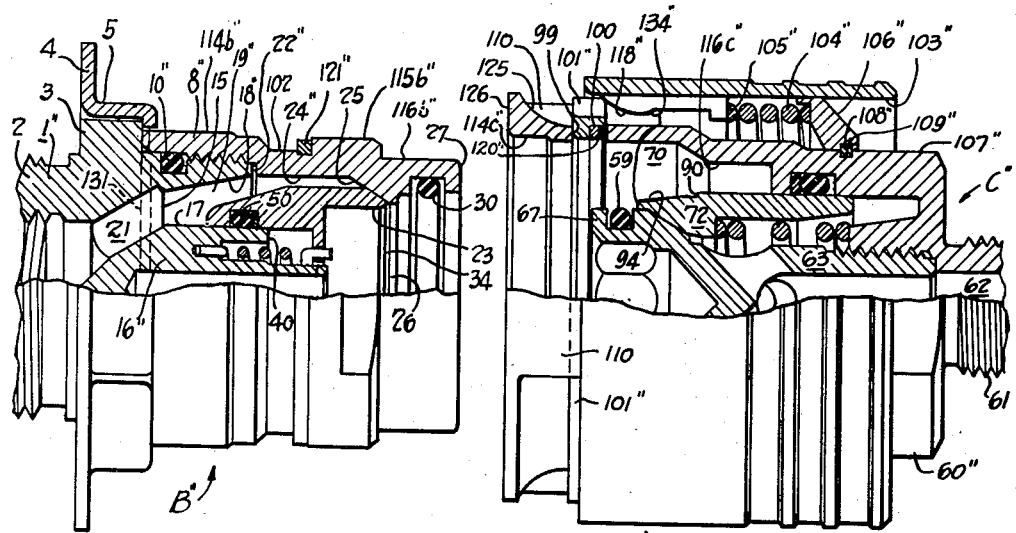
FIG. 13
FIG. 14
INVENTOR.
Paul D. Wurzburger
BY Schramm and Knowles
Attorneys

United States Patent Office 2,837,352
Patented June 3, 1958

2,837,352

SWIVEL COUPLING WITH RESILIENT RING TO BIAS DETENT MEANS

Paul D. Wurzburger, Cleveland Heights, Ohio

Application November 8, 1954, Serial No. 467,522

19 Claims. (Cl. 285—93)

This invention relates to couplings of readily separable component parts. It is directed particularly to improvements in couplings of the quick disconnect type such as are used in hydraulic systems of aircraft and land vehicles. More particularly the coupling contemplated is of the so-called "push-pull" type the parts of which are adapted to be connected and disconnected by simply pushing and pulling, respectively, without twisting or turning of one part relative to the other and without using special tools or coupling aids.

The invention is principally concerned with the interlocking of the coupling parts in obtaining the desired push-pull operation. It is apparent that this feature is useful with other than the illustrated self-sealing fluid coupling, having application in plain hydraulic hose couplings and in electrical and mechanical couplings.

In the construction of a coupling of the character referred to, having separable parts connectible to the ends of fluid or other conduits or elements to be joined, there are certain physical requirements that must be met. Couplings intended for use in aircraft hydraulic systems must be light in weight and their physical dimensions must be held within prescribed envelope limits. Lightness and compactness are, of course, desirable characteristics in couplings for both the commercial and military fields and accordingly these characteristics are specific objectives of the invention.

Separable couplings have heretofore been made that are connectible and disconnectible by push-pull action. Such couplings employing pivoted dogs or latches have not been entirely satisfactory because of manipulation difficulties, stress concentrations leading to failure, and mechanical complications that increase manufacturing and assembling problems and result in high cost. Couplings employing radially movable detents such as balls, pistons or plugs to effect the interlock of the coupling parts are also characterized by stress concentrations, require a multiplicity of parts resulting in mechanical complication and are apt to be uncertain in action, resulting in unreliable securing of the parts and failure in use. To avoid the objections inherent in the swingable latch and detent types of push-pull couplings it has heretofore been proposed to use a circular ring for interlocking the coupling parts. Such a ring distributes the stress about the entire circumference of the coupling, or substantially so, and has fewer parts than the latch and detent type of coupling. By reason of its very simplicity, however, the resilient ring or interlock presents difficulties. It must be expanded or contracted radially by an actuator movable axially on the coupling with the result that high friction forces are encountered. The locking structure must positively be fully engaged to avoid objectionably high stresses at the engaged surfaces. The locking ring structure must be retained in engaged position to guard against inadvertent release of the coupling and it is also desirable to provide a visible indicator or an indicator readable by touch to permit inspection of the assembled coupling in determining its safety condition.

Another feature of the invention is related to the requirement referred to above, that the coupling be held within specified envelope or size limits. To keep the overall diameter of the device within designated limits, some of the components must be thinner than in conventional design practice. The resulting reduction in section has the effect of weakening certain parts or components and special structural features have been resorted to and unusual combinations and arrangements of parts have been provided to achieve the desired dimensional characteristics while yet obtaining the strength necessary to withstand the high internal fluid pressures for which the coupling is intended. One such structural feature is concerned with the tendency of the outer of the tubular coupling members to be distended or otherwise deformed at or about its open end under the severe stresses to which it is subjected by the axial loads imparted to it through the segments of the locking ring structure. The present invention contemplates as one of its objectives the strengthening of the member which carries the locking ring structure without exceeding reasonable size limitation and without interfering with the action of the actuator or sleeve carried by such outer member for contracting the locking ring structure.

Another structural feature is related specifically to the interlock which is provided by a steel or other hard spring metal ring carried by one of the coupling members and which is radially expansible and contractible as by being split for movement into and out of engagement with an abutment on the other coupling member in establishing the interlock. Releasing movement is accomplished by force stored in the split lock ring during the deformation to which it is subjected in the locking operation.

One of the problems heretofore encountered in connection with quick disconnect push-pull couplings of the character referred to stems from the use of resilient means to maintain the interlocking parts in engaged positions. Upon failing or even weakening of such resilient means there is the possibility of inadvertent release of the locking connection with attendant separation of the coupling parts. In the device of the present invention the locking means is held positively in engaged position and separation of the coupling parts is accomplised only upon positive shifting of the components to predetermined unlocking positions.

Another objective is therefore concerned with the provision of positive locking in a coupling of the type utilizing a spring ring or equivalent as the locking element. More particularly this aspect of the invention is concerned with a split ring locking structure which is radially expanded or contracted by a plurality of cam elements spaced circumferentially about the ring structure and which is held in interlocked position by circumferentially spaced elements which generate a cylindrical surface, thereby eliminating any tendency of the resilient locking ring to release itself.

Another object is to provide a self-locking coupling structure in which the relative movement of components of one coupling part serves as a visible indicator or signal denoting the correct and complete coupling together and locking in place of the separable parts. In its preferential form the invention contemplates the utilization of a sleeve carried by and axially slidable on a tubular component of one of the coupling parts, the sleeve being spring pressed and arranged not only to actuate but also to lock in place the split locking ring. By suitable provision of marking indicia or by shaping of the sleeve and the supporting tubular component the position of the sleeve in the fully locked condition is readily apparent by visual inspection or by feeling of the parts by the operator, using the same hand that effects the coupling.

A further object of the invention is to provide a split or spring ring type of quick disconnect coupling structure wherein a resilient locking ring structure is carried by the same coupling member that carries the actuating element or elements for effecting the desired distortion of the ring structure incident to the coupling and uncoupling operations. As a specialized version concerned with this aspect of the invention the locking ring structure is carried by the outer of the coupling elements, the interlock being accomplished by compressing the ring structure radially inwardly into an annular groove formed circumferentially about the other or inner of the coupling parts. The locking structure is thus compressed or stressed in the coupling operation and is held in the locking position by positive confinement maintained by an axially slidable sleeve held captive on the outer part of the coupling. As a further refinement of this feature the axially slidable actuating sleeve is formed with both inclined or cone generated surfaces and axial or cylinder generated surfaces so that axial movement of the sleeve which carries the inclined surfaces over the locking ring obtains radial distortion of the locking ring for locking the coupling parts together, whereas movement of the cylindrical surfaces of the sleeve over the locking ring retains the latter at a desired diameter without axial thrust on the actuating sleeve.

A still further object of the invention is concerned with the provision of an improved self-centering ring structure which retains the locking element in coaxial relation to the coupling part by which it is carried so that in assembling and disassembling the coupling parts the locking ring structure moves smoothly into and out of locking position without becoming radially displaced and without interfering with the assembling operation. More specifically this phase of the invention provides a composite locking ring structure in which a plurality of arcuate segments are related to a resilient split ring in such a way that while retaining their circumferential positions relative to one another the arcuate segments may slide circumferentially relative to the split ring during expansion and contraction of the latter.

Other objects and advantages relate to certain novel features of construction and combinations and arrangements of parts, all of which are set forth in the following detailed description of an embodiment representing the best mode of practising the invention. This description is made in connection with the accompanying drawings forming a part of the specification.

In the drawings:

Fig. 4 is a transverse sectional view taken substantially along the irregular line indicated at 4—4 of Fig. 1 to show, in particular, the circumferential distribution of the segments of the locking ring structure about the body member of the outer coupling part;

Figs. 5 and 7 are elevational details showing, respectively, front and rear views of the lock ring structure;

Fig. 6 is a sectional view through the lock ring structure, this view being taken subtantially along the line indicated at 6—6 of Fig. 5;

Fig. 8 is a fragmentary detail taken substantially along the line 8—8 of Fig. 7 and enlarged with respect to that figure to show the stop or detent which locates one of the segments in relation to the split steel lock ring;

Figs. 9–11 are longitudinal sectional views, partly diagrammatic and with certain of the crosshatching ordinarily used to indicate a section omitted for clarity, these views illustrating modifications and variations of structure and combinations of parts and showing the relationship of the several members and components in successive stages of a normal coupling operation;

Fig. 12 is an elevational view, partly in section and with parts broken away and removed, similar to Fig. 1 and illustrating a modified coupling; and Figs. 13 and 14 are fragmentary elevational views, partly in section, showing the parts of the coupling of Fig. 12 disassembled, these views corresponding to Figs. 2 and 3, previously described.

Figure 1:
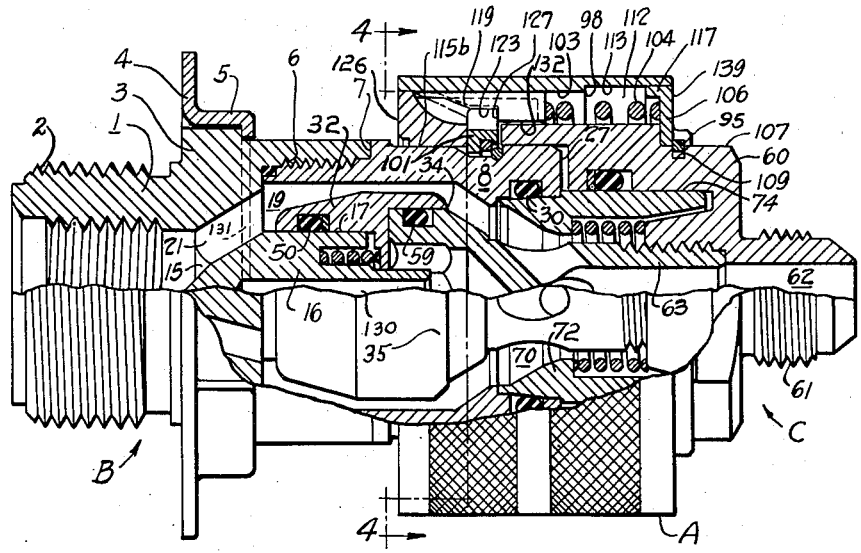
Figure 1 is an elevational view, partly in section and with parts broken away and removed, showing a self-sealing fluid coupling of the push pull type embodying the principles of the present invention, the coupling parts being here shown in the fully assembled condition.

The drawings illustrate a self-sealing fluid coupling of the "push-pull" quick connect and quick disconnect type which is representative of the best known mode of practising the invention. Certain features of the coupling are described in greater detail in copending application for United States patent, Serial Number 467,523, filed November 8, 1954.

The separable coupling parts are designated generally at B and C, the latter carrying an axially slidable lock actuating sleeve A. This sleeve actuates a ring type locking structure that holds the coupling parts together and that is more fully described further on. The coupling part B comprises a tubular body member 1 formed as by forging or machining a suitable metal such as aluminum. Base end 2 is formed as with external threads for attachment to the hydraulic conduit or line to be terminated by the coupling part B. Intermediate its ends the body member 1 is formed with an integral external hex section 3 over which may be received a plate 4 stamped or otherwise formed with a hex embossment 5 that matches and receives the body hex 3. The plate 4 serves as a mount for wall attachment of the coupling body. The coupling part may, of course, be used without the mounting plate 4, being then free on the end of the line or conduit, wholly supported by the latter.

The other or front end of the tubular body 1 is threaded internally at 6 to receive a tubular extension member 8 which is coaxial to the main body member 1 and, as will appear, constitutes the element which physically connects the coupling parts and transmits all stresses tending to separate the coupling parts.

The threads on the extension 8 are formed on a reduced diameter base end portion providing a circular shoulder against which the end of the body member 1 is abutted at a meeting plane 7, gasket 13 forming a fluid seal. The body and extension members have external cylindrical surfaces of the same diameter on the opposite sides of the meeting plane 7 in the provision of a common cylindrical surface 115b which constitutes one of the several cylindrical surfaces of the externally stepped or plug part B, this being a feature which facilitates the assembling together of the coupling parts, as will appear.

Intermediate its ends the main body member 1 is formed with an integral web or partition 15 which supports a hollow stem 16 in coaxial relation to the body member.

Within the body extension 8 the fluid passage includes a frustoconical or tapered valve seat portion 25 the small diameter end of which terminates at a circular opening 26 axially spaced inwardly from end face 27 of the extension 8.

Sealing of the coupling part B when it is disconnected from the coupling part C is effected by a barrel shaped valve body 32 which is mounted on the center stem 16 for axial sliding movement. The interior of the barrel 32 is cylindrically shaped and has a running fit on the cylindrical outer wall 17 of the center stem.

The forward end of the barrel valve 32 is formed with a spherical sealing end surface 35 and terminates in a smoothly rounded or contoured annular nose 34. The spherical surface 35 makes circular line contact with the frustoconical valve seat 25 inside of the tubular body extension 8.

The companion outer or socket coupling part C that mates with the inner or plug coupling part B comprises a main tubular body member 60 formed like the body 1 and extension 8 of the part B as by forging or machining a suitable light metal, such as aluminum. At its rear end the main body is threaded at 61 or otherwise formed for connection to the end of the conductor or line to be terminated by the coupling part such line delivers or receives fluid to or from the coupling through center passage 62 of the coupling part.

As the coupling parts B and C are brought together, the tubular extension 8 of the former being received within the tubular forward portion of the latter in telescopic relation, the forward end of the sleeve valve 72 is received within the forward end of the extension member 8. In this assembling operation the inner edge corner of the end face 27 on the extension member of the coupling part B is received against a shallow, circumferentially extending external radial shoulder 90 on the outside of the sleeve valve 72. The engagement of the shoulder 90 against the extreme forward end face of the coupling part B causes the sleeve valve 72 to be displaced from sealing engagement against the stem head 66 so that the fluid passage is opened through the chamber 70.

A mechanical interlock is effected between the inner coupling part B and the outer coupling part C by means of an annular lock ring structure carried by and constituting part of the latter. This locking structure comprises an expansible and contractible split ring 100 of suitable resilient material such as spring steel. Distributed about the circumference of the split ring and constituting part of the locking structure are a plurality of pressure applying or load bearing elements 101 which preferably take the form of and are referred to as segments. To receive the annular locking structure the body member 60 of the outer coupling part C is formed with an internal circumferentially extending channel 99 which opens through internal cylindrical surface 115c of the coupling part and is spaced from front end face 126 of the body 60. In the fully assembled relationship illustrated in Fig. 1 the contractible split ring 100 is received behind a fixed annular split ring 121 of steel or other hard metal inserted or embedded in a suitable circumferential pocket along one wall of an annular groove or channel 102 formed in the external cylindrical surface of the other or internal coupling part B. One of the interengaging rings 100, 121, here the expansible and contractible ring 100, is of square or rectangular section, whereas the other of the rings, here the fixed or embedded abutment ring 121, is of circular section so that in the locked position the rings bear against one another along a circular contact line, which facilitates unlocking or disassembling by minimizing friction between the interengaged locking components.

Contraction of the ring 100 to the coupling locking position of Fig. 1 is effected by the actuator sleeve A previously mentioned. This sleeve is received embracingly about the tubular body 60 of the coupling part C and has a plurality of circumferentially spaced internal axially extending integral ribs 119 that are interfitted with an equal number of axially extending ribs 110 integrally formed about the forward end of the tubular coupling body 60.

Figure 3:
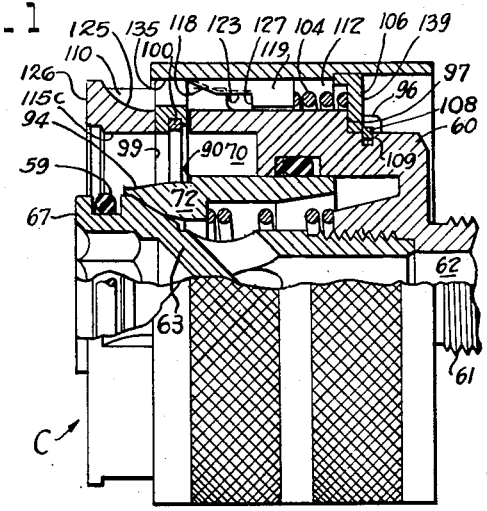
Fig. 3 is a fragmentary elevational view, partly in section, showing the outer or socket part of the coupling assembly of Fig. 1, this view showing the lock ring and lock ring actuator retracted in readiness for a coupling assembling operation.

To bias the sleeve A toward the left, as viewed in Figs. 1 and 3, a helical coil compression spring 104 is disposed in an annular chamber 112 within the sleeve and surrounding the coupling body 60, the sleeve being formed with counterbores 103 and 113 that define the annular chamber 112. Inside the sleeve A radial end faces on the ribs 119 at the inner end of the counterbore 103 serve as abutments to receive the reaction of the spring 104. The other end of the spring is received against a locating or retaining ring 106 the outer periphery of which has a sliding fit within the counterbore 113 of the sleeve A. A flange 117 at the outer periphery of the ring 106 is directed axially into the interior of the sleeve. This flange provides an annular seat or recess for receiving and locating the spring 104 and the edge of the flange engages a shallow radial shoulder 98 between the counterbores 103 and 113 of the sleeve, thereby serving as a stop which locates and determines the retracted position of the actuator sleeve. At its inner periphery the ring 106 is abutted against an annular radial shoulder 97 provided by a reduced diameter portion 107 turned on the coupling body. To locate and hold the retainer ring 106 against the shoulder 97 the inwardly directed cylindrical face on the flanged inner periphery of the retainer ring is formed with a shallow circumferential groove 95 that registers with a deeper but similar groove 109 formed about the reduced diameter portion 107 of the coupling body. A split spring steel lock ring 108 is held captive in the grooves 95 and 109 and bridges the meeting surfaces between the retainer ring and the coupling body. This result is achieved by making the square sectioned lock ring 108 of greater radial depth than one of the grooves in which it is received. In the arrangement shown the groove 95 in the retainer ring has a radial depth about half the radial dimension of the lock ring so that the latter, which is overformed in manufacture to a diameter larger than that which it occupies in the assembly, projects for about half its radial depth in to the matching groove 109 in the coupling body. At a number of circumferentially spaced points about the circumference of the retainer 106 the inner peripheral flange is relieved or cut away, as indicated at 96, to permit radial pressure to be applied to the lock ring 108 simultaneously at a number of circumferentially spaced points. Such compression of the lock ring contracts it wholly into the relatively deep bottom groove 109 in the coupling body so that it clears the inner periphery of the retainer ring 106 and the latter can be removed axially from the coupling body for disassembly of the coupling sleeve and related components of the coupling part. In reassembly the procedure is reversed, with the split lock ring 108 being first contracted into the deep body groove 109 to permit the retainer 106 to be slid axially into place. When the grooves 95 and 109 are registered the inherent resiliency of the compressed split ring 108 causes it to expand outwardly into the retainer ring groove, where it bottoms, and the parts are locked or keyed together in the desired relative positions.

Each of the arcuate segments 101 is formed with a circumferential rabbet or groove 120 to receive the expansible split ring 100, it being desirable that these components of the locking ring structure be held against relative axial movement under stress of the coupling interlock. Although it is feasible to make the arcuate segments substantially U-shaped in cross section so they will engage the lock groove walls, it is preferable, as shown, to use an L-shape so that one side surface of the resilient split ring 100 is exposed and engages directly the radial face of the lock groove 102 or preferably, and as shown, engages the curved face of hard steel split ring insert 121, thereby providing bearing substantially continuous about the entire circumferential extent of the resilient lock ring structure. A shallow channel is formed in the bottom of the rabbet 120 in each of the segments 101 to receive the outer periphery of the lock spring ring 100, there being thus provided a narrow circumferential lip 133 overhanging the outer edge of the exposed face of the split ring and thereby retaining the latter in the plane of the segments.

The depth of the internal channel 99 in the coupling body 60 is at least equivalent to the radial depth of the locking ring structure so that in the retracted condition, as shown in Fig. 3 the locking ring structure is completely recessed into the channel in the body member and in no way interferes with the coming together of the coupling parts. The radial thickness of the walls of the tubular body 60 at the forward end of the coupling part and between the axial ribs 110 is less than the radial depth of the lock ring channel 99 so that the latter forms radial slots that open into spaces 122, Fig. 4, between the axial ribs. The lock ring segments are thus exposed for engagement by the inclined cam surfaces 118 that are formed on forward portions of the actuator sleeve ribs 119 that lie in the slots between the body ribs 110. The radial depth of the segment rabbets 120 is greater than the radial thickness of the split spring locking ring 100 so that the cylindrically curved inwardly directed faces of the segments are located radially inwardly of the surface generated by the split ring. Thus the relatively soft aluminum segments and not the hard steel ring 100 contact the cylindrical surface 115b of the part B should the locking ring become partially contracted during a coupling operation and before clearing the fixed abutment ring 121. To prevent gouging of the segments by the ends of the split ring 100, such ring ends are rounded as shown at 144 to ride smoothly in the bottom of the rabbets 120 upon relative circumferential movement incidental to contraction and expansion of the locking structure. One or more stops may be formed on the segments to engage the ends of the split ring and limit relative circumferential movement. A suitable stop arrangement is obtained by a bent in finger 142 which is separated from the body of the segment by a saw slot 143 preliminary to the bending. The axial ribs 110 and the sloping shoulders 125 between their forward ends on the main body member 60 may be formed as by milling circumferentially spaced axially extending slots on the outside of the body member. These axial slots or grooves do not extend through the front radial face 126 of the tubular body but by being made progressively shallower, terminate short of such face in the provision of the sloping shoulders 125. The forward end of the body member 60 thus comprises a circumferentially continuous ring of relatively heavy section which provides the strength needed to withstand loads imposed on this front end of the body member 60 when the lock ring 100 is engaged against the bearing ring insert 121 and the coupling is subjected to high internal fluid pressures tending to separate the coupling parts. The heavy section front end of the body member is bell shaped by reason of the outwardly curving surfaces that constitute the sloping shoulders 125.

To insure retention of the segments 101 in desired circumferentially spaced positions, each of the segments is T-shaped as viewed axially (Figs. 4, 5 and 7) comprising a central radially deep portion 128 and wing portions 129 that are radially shallow. The central deep portions 128 project radially through the groove slots and are received locatingly in the axial grooves 122 provided in the body member 60 between the ribs 110. These are the grooves that also accommodate the sleeve ribs 119 so that in the axial movement of the sleeve A back and forth on the body member 60, the ribs 119 ride on the central portions 128 of the segments. The wing portions 129 of the segments extend circumferentially in the channel 99 and underneath the channel bridging ribs 110 of the main body member 60.

Cam surfaces 118 are transversely curved in planes normal to the axis of the coupling part to conform to the crowns 128 of the segments 101 but are straight in longitudinally axial planes. These cam surfaces 118 extend between an internal axially short cylindrical surface 135 at the forward end of the coupling sleeve A and inwardly directed holding faces 123 of the ribs 119. The axial extent of the cylindrical surface 135 is approximately equivalent to that of the locking segments 101 so that the latter are recessed within and held captive by the forward end of the actuating sleeve when the latter is in the fully retracted position shown in Fig. 3. The angular intersections etween the oblique cam surfaces 118 and the cylindrical surface 135 receive the upper edge corners of the segments 101 so that the segments, held outwardly against the sleeve by the split spring ring 100, serve as detents to hold the actuating sleeve retracted or in "cocked" position for and during the first stages of assembly of the coupling parts.

In movement of the actuator sleeve A from the retracted position shown, say, in Fig. 9 to the locked position shown, say, in Figs. 1 and 11 the inclined cam surfaces 118 ride over the central portions 128 of the ring segments 101 and effect contraction of the locking ring structure in such a manner as to force it into the annular channel 102 provided therefor in the coupling part B. When the actuating sleeve A is fully advanced in the coupling operation, the axial holding surfaces 123 of the ribs are received on the segments to hold the locking structure contracted in locked position. By reason of the disposition of the cam surfaces 118 at substantially equidistant positions about the circumference of the actuator sleeve, the radial forces applied to the locking ring structure are distributed equally about the circumference of the latter and uniform compression of the locking ring is thereby obtained.

The forward movement of the actuator sleeve A, or to the left as viewed in Figs. 9–11, does not cease at the completion of the radial contraction of the locking ring structure but continues to carry cylindrically curved portions 123 of the internal faces of the ribs 119 over the segments 101 of the locking structure until the latter are engaged by shoulders 127 of rear portions 132 of the ribs. By reason of the confining of the locking ring structure within the cylindrically curved internal surfaces of the actuator ribs, a positive locking of the parts is obtained and to effect a release it is necessary that the sleeve be retracted or shifted to the right as viewed in Fig. 1 so as to clear the confining surfaces 123 from about the locking ring structure.

Figure 2:
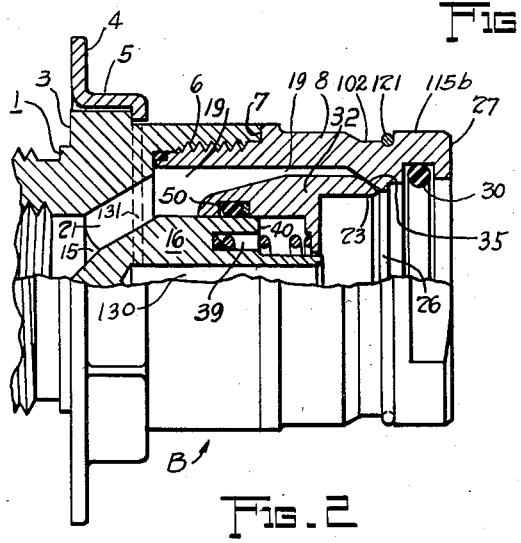
Fig. 2 is a fragmentary elevational view, partly in section, showing the internal or plug part of the coupling assembly of Fig. 1.

When the coupling parts are disconnected their internal fluid passages are sealed by the spring pressed valve bodies as shown in Figs. 2 and 3. The barrel valve 32 closes the passage 19 of the coupling part B and the sleeve valve 72 closes the passage 70 in the coupling part C. Also, in the separated condition of the coupling parts, the locking sleeve A is retracted to release the locking ring structure so that the spring ring 100 and the arcuate segments 101 are expanded radially outwardly into the channel 99. The interior of the socketed coupling part C is thus clear at the diameter 115c for reception of the tubular extension member 8 of the coupling plug part B. In this retracted position of the sleeve A the spring 104 is compressed and holds the forward edges of the rib cams 118 strongly against the rear edge corners of the lock ring segments 101. The spring steel split locking ring 100, in its unstressed condition, is of larger diameter than shown so that it is contracted in assembly and normally presses the segments 101 outwardly against the bottom of the channel 99 or the ribs 119 of the sleeve A. The strength of the split lock ring spring 100 is sufficiently great even in the expanded position of Fig. 3 to withstand the contracting force transmitted to the ring through the segments and the cam ribs 118 under the influence of the sleeve biasing spring 104. Thus in the expanded release position of Fig. 3, although the cam ribs 118 are being urged against the segments 101 with the full force of the compressed spring 104, there is no resulting contraction of the lock ring structure 100, 101 and the latter holds itself in the fully retracted release position shown.

Figs. 9–11 are partially diagrammatic to illustrate sequential stages in the coupling and uncoupling operations as will appear. These figures also illustrate several modifications of structure which will be described using reference numerals that are primed to designate changes from the details previously referred to. Like parts are designated by the same reference numerals used in the preceding figures. To facilitate an understanding of the various movements that take place during the coupling operation, relatively heavy crosshatching is applied to the sections of those components and elements that move during the steps between successive coupling stages, relatively light crosshatching is applied to sections of components and elements that do not move. Thus in Fig. 9 the heavily crosshatched components are those which move in shifting the coupling parts from the relative positions shown in Fig. 9 to the positions shown in Fig. 10. In Fig. 10 the heavy crosshatching is applied to the components that move in shifting the coupling parts from the stage shown in Fig. 10 to the stage shown in Fig. 11. In Fig. 11 the heavy crosshatching is applied to the components that move in shifting the coupling parts from the stage shown in Fig. 11 to the stage shown in Fig. 1.

In one of a number of structural modifications and variations which may be resorted to for the purpose of satisfying particular use requirements body member 60' of the coupling part C' is of relatively greater axial length than the tubular outer body member 60, previously described, tubular extension portion 140' being integrally formed on the front or leading end of the tubular body 60'. This extension portion has a cylindrical internal surface 114c' having a sliding fit with the external surface 114b' of the body member 1' of the coupling part B'. The modification thus provides coaxial internal cylindrical surfaces 114c' and 115c' in the outer member of the coupling part C' that sequentially and slidingly engage complemental external cylindrical surfaces 114b' and 115b' on the body members of the couplings part B'. These stepped diameters of the plug and socket coupling parts provide for progressive centering of one coupling part within the other during the assembly operation and facilitate the fitting together of the parts since, at the beginning of the assembling operation, the relatively small diameter surface 115b' of the plug part B' is received within the relatively large diameter surface 114c' of the socket part C'. As the assembling operation proceeds the front or leading end of the body extension 8, having external surface 115b', is received within the complemental corresponding diameter portion of the outer body member 60' of the socket part C' before the tubular extension 140' of the outer member is received on cylindrical surface 114b' of the part B'. The sliding fits between the inner and outer coupling parts at the several diameters are thus obtained sequentially beginning at the intermediate diameter 115b', 115c'. The coupling parts become progressively more firmly or rigidly oriented or aligned one with the other during the course of the coupling operation.

Figs. 9-11 also show a variation in the arrangement of the split steel rings that abut one another in the locking together of the coupling parts. Instead of the square sectioned ring being expansible and contractible and the round sectioned ring fixed, as described above, a square sectioned ring 121' is used as the fixed ring embedded and held by its inherent resistance to distention in an annular groove formed in the bottom of the main locking groove or recess 102. Segments 101' are carried on an expansible and contractible steel ring 100' which is of round section. The segments 101' are similar to the segments 101 previously described except they have round sectioned or other suitably shaped rabbets or grooves 120' to accommodate the round sectioned spring ring 100' in lieu of the square sectioned grooves 120 mentioned above. Thus when the coupling parts are locked together the curved side face of the round sectioned ring 100' makes circular line contact against the flat radial face of the square sectioned fixed ring 121'. The split ring 121' is formed or sprung to a diameter less than that to which it is held when seated in the recess provided therefore in the bottom of the groove 102 so that the spring ring, in effect, grips the body extension member 8 and thereby holds itself in place.

Another variation shown in Figs. 9-11 is the use of oblique or reversely inclined surfaces 123' on the sleeve ribs 119 in lieu of axial surfaces 123 previously described. The reverse inclination of the rib surfaces 123' relative to the coupling axis is less than that of the 25°-35° forward inclination of the cam surfaces 118, being only about 2°-6° preferably about 4°, so as to provide merely a restraining or detent action against retraction of the sleeve A' when the latter is advanced. The inclination of the detent surfaces 123' is thus opposite to that of the cam surfaces 118 and as a further refinement of the design the central portions of the segments are in this modification formed with inclined outer faces 138' which match the slope of the rib detent faces 123'. By reason of the radial pressure maintained between the inclined faces 138' on the segments and the matching detent surfaces 123' of the confining ribs, the arrangement provides a yielding restraint or detent action against retraction of the sleeve A'. The locking ring structure must be slightly contracted against the expanding force of the split ring 100' in drawing the inclined faces 123' of the sleeve ribs off the lock ring segments.

The following sequence of relative movements of the various parts and components is described on the basis of an assumed situation wherein the coupling part B is mounted in a panel or bulkhead as by the embossed flange plate 4 so as to be supported rigidly and the operator manipulates only the coupling part C and the associated locking sleeve A in effecting the assembly. It is apparent, of course, that the sequence of relative movements is the same when both of the coupling parts are hand held or the part B is hand held and the sleeve C is fast in a suitable support or holder.

The first stage of assembly, Fig. 9, follows the initial aligning of the coupling parts in which the stepped internal diameters of the socket member 60 facilitate entry therein of the stepped diameter portions of the plug member 8 and enables the operator to fit the parts together with considerable facility even in the dark or in a remote position where the parts cannot be seen.

At this first stage the internal fluid passages are still sealed by the valve bodies 32 and 72 and, of course, there is no interlocking of the mechanism between the parts. Thus the parts can be brought to the first stage of Fig. 9 and separated if desired without any opening or closing of the internal valves taking place and without any shifting of the locking structure or sleeve A.

In the movement of the parts to the initial position of Fig. 9, this initial position being determined by engagement of the end abutment face 27 of the extension body 8' on the part B' against the shallow radial shoulder 90 on the sleeve 72 of the part C, any air trapped within the annular space defined by the coupling parts outside the O-ring 30 escapes to the atmosphere through the openings in the outer member for the locking structure segments or the clearances between the two coupling parts at the diameter of the cylindrical surfaces 115b' and 115c'. Air trapped between the stems 16 and 63 and within the barrel valve 32 by the sealing action of the O-rings 50 and 59 is vented to the atmosphere through an axial bore 130 formed longitudinally in the stem 16 in communication with one or more radial passages 131 drilled or otherwise formed through or adjacent the hex portion of the body 1. The passage or passages 131 extend through the partition 15 that supports the stem 16 at a point or points intermediate the oblique passages 21.

In the continued movement of the coupling part C' onto the coupling part B' from the second stage position shown in Fig. 10 to the third stage position (not shown) the engagement of the end face 67 on the head of the stem 63 against the web or partition 42 of the barrel valve 32 displaces the latter from its seat 25, thereby placing the internal passages of the coupling parts in communication with one another and with the annular passage or channel 19 that surrounds the barrel valve 32. Air or other fluid trapped between the stem ends is vented through the passage 131 as previously mentioned.

In the valve opening stages of the coupling operation the sleeve A' remains in retracted position with the locking structure comprising the spring ring 100' the segments 101' in their fully expanded positions. In this connection it is significant that, although the operator applies the coupling force to the sleeve A' there is no relative movement of the sleeve on the body 60' the lock spring 100' being sufficiently stiff and overformed to a larger diameter to resist compression by the cams 118 under such axial forces as are necessary to effect sequential unseating of the valves 72 and 32' against the internal fluid line pressures normally encountered and incidental friction.

When the parts have been moved to the third stage of assembly (not illustrated) both the sleeve valve 72 and the barrel valve 32' are displaced from their seats so that the axial force that must be exerted on the coupling parts to hold them assembled at this stage is minimized by reason of the differential or balancing fluid pressures referred to. The limit of movement together of the coupling parts is determined by bottoming of one or both of the valves 32', 72. This bottoming prevents further telescoping together of the coupling parts and operator completes the coupling operation by increasing the axial force on the sleeve A so as to advance the latter axially forward on the tubular body 60' or to the left as viewed in the figures. This movement of the sleeve carries the cam surfaces 118 of the ribs 119' across the central portions 128' of the segments 101' and forces the latter and the locking ring 100' to contract radially inwardly into the channel 102 of the body member of the companion coupling part, thereby effecting the desired interlock Fig. 11. The locking ring 100 is received in its contracted shape behind the circular sectioned abutment ring 121' embedded in the groove 102.

Continued movement of the actuating sleeve A from the fourth stage position of Fig. 11 to the fifth stage position (not shown for the embodiment of Figs. 9–11, but which corresponds to Fig. 1 previously described) carries the holding portions 123' of the ribs 119' onto the segments 101'. Force components tending to shift the sleeve A' to release position are thus eliminated from the forces exerted by the locking ring spring 100' against the ribs 119' through the segments 101'. The limit of forward movement of the sleeve A' relative to the body member 60' of the coupling part C' is determined by engagement against rear faces of the segments 101' of radial shoulders 127 on the ribs 119' adjacent the inclined surface detent rib portions 123'.

When the operator has completed the assembly of the couplings and releases the sleeve A' the internal fluid pressure tends to separate the coupling parts and causes the spring locking ring 100' to bear strongly against the side face of the rigid insert ring 121'. There is thus a slight shifting apart of the components of the coupling as the final stage of the assembling operation is completed, the partition 42 of the barrel valve 32 moving away from the end face 40 of the stem 16 against which it was bottomed during application by the operator of sufficient axial force to the sleeve A (or A') to effect the contraction of the locking structure into the groove 102.

In the fully coupled position of Fig. 1 the radial end faces of the coupling sleeve A coincide or are coplanar with the front end face 126 of the body 60 and end face 139 of the retainer ring 106. There is thus provided an indicator which, visually or by touch, informs the operator that the coupling is fully and properly assembled. If for any reason, such as the presence of an obstruction in the lock channel 102, the locking structure cannot be wholly contracted, the sleeve A is prevented from moving to the position of Fig. 1 in which its ends are aligned with the end faces 126, 139 and the operator readily perceives the failure of completion of the assembly and can correct the difficulty.

Should the sleeve A become advanced from the retracted position of Fig. 3 to the locking position of Fig. 1 while the coupling part C is separated from the coupling part B it is impossible for the several parts to be brought even to the initial stage of Fig. 9. In the event of such inadvertent advancement of the coupling sleeve the resultant contraction of the locking structure 100, 101 projects the segments radially into the interior of the body member 60 at the diameter of the surface 115c. Thus any attempted assembly of the coupling parts with the sleeve so advanced and the locking structure so contracted results in engagement of the front faces of the segments against the end face 27 of the coupling part B, thereby preventing further insertion of the plug part into the socket part and, of course, preventing any opening of the internal valves. A person attempting to assemble the coupling parts with the sleeve incorrectly advanced instinctively inspects the interior of the socket part C to determine the cause of the stoppage. By the simple expedient of coloring the segments 101 a distinctive red while the body member of the coupling is, say, blue or green, even a person unfamiliar with the coupling quickly perceives the cause of the obstruction and manipulates the sleeve A to the retracted position of Figs. 3 and 9. The distinctively colored segments 101, being thus retracted into the body groove 99, are no longer seen to project into the socket of the coupling part, and the operator appreciates that proper coupling can be effected.

In effecting the separation of the coupling parts from the interlock engagement of Fig. 1 the sleeve A is retracted or moved to the right to the release position shown in Fig. 3. The segments 101 being no longer confined or embraced by the sleeve are shifted radially outwardly by the force of compressed locking ring 100, the attendant expansion of the locking ring freeing it from behind the fixed abutment ring 121 and thereby releasing the interlock between the coupling parts. When the rings 100 and 121 are thus disengaged the coupling parts are readily pulled apart, the reaction of the fluid pressure against the valves 32 and 72 forcing the valves to their respective passage sealing positions. The movement of the valves against their valve seats effects axial separation of the coupling members.

Dimensional tolerances that are employed in designing couplings of the present type result in certain permissive axial clearances which allow slight axial shifting of one coupling part relative to the other even when the rings 100 and 121 are interlocked. In the constructions illustrated the springs that bias the valves 32 and 72 toward their seats react against the coupling parts so as to maintain a yielding axial force which holds the contracted locking ring 100 against the fixed ring 121. Thus looseness of the joint and rattling are eliminated or at least minimized. In a modified arrangement, however, wherein the barrel valve 32 and its associated stem structure are eliminated and wherein the sleeve valve 72 as such is omitted and replaced by a fixed tubular element rigidly secured in the coupling body part 60, the interlocked rings 100 and 121 are conveniently loaded by an axial force derived from compression of a resilient deformable O-ring seal corresponding in location and function to the seal 30. The axial force is derived from such O-ring seal by reason of the conical or tapered surface 94 against which the deformable circular seal is compressed as the coupling parts are brought together.

Figures 12–14 illustrate a modified version of the coupling of the present invention, this modification having certain advantages where it is desired to obtain a more positive locking in place of the coupling sleeve, where it is desired to utilize flat surface contact between the fixed and expansible rings of the interlocking structure and where a different connection is desirable between the body and extension members of the coupling part B. In the modified device, elements and components corresponding to those previously described are indicated by the same letters and numerals of reference, the letters and numerals being double primed where the particular element or component represents a change or modification.

The threaded joint 6″ by which the main tubular body member 1″ and the body extension 8″ are connected comprises external threads on the forward end of the body member and internal threads in the base end of the extension member. The circumferential meeting faces of the body and extension members outside the threaded joint 6″ are formed to define an annular chamber that receives a deformable seal such as a rubber O-ring 10″.

The internal surface 18″ of the body member 1″ tapers outwardly toward circular end face 22″ or such body member so that the annular channel 19″ increases in diameter toward the body end 22″. Within the body extension 8″ the fluid passage is defined by a circular surface of revolution that includes cylindrical portion 24″ and a frusto-conical or tapered valve seat portion 25.

The interlock between the coupling parts is effected by a ring assembly or structure similar to that previously described. The actuator sleeve A″ is received embracingly about the tubular body 60″ of the coupling part C″, the sleeve being formed with a counterbore 103″ from its rear end in the provision of an annular clearance between the sleeve and the coupling part body which receives a helical coil compression spring 104″ that reacts between radial shoulders 105″ of the sleeve ribs and a ring or signal adapter 106″ embracing the coupling part body 60″. The ring 106″ may be received about a reduced diameter portion 107″ of the coupling body and held by the spring 104″ against a resilient split locking ring 108″ seated in a groove 109″ in the reduced diameter portion 107″.

The tubular coupling body 60″ is counterbored from its front end at 114c″, 115c″ and 116c″, providing stepped coaxial cylindrical surfaces that are slidable over mating external cylindrically stepped surfaces on the tubular extension comprising the forward end of the coupling part B″.

In the movement together of the coupling parts the tubular body 60″ moves along the extension member 8″ of the part B″ guided first at the diameter of the surfaces 115b″, 115c″. The same members of the coupling parts subsequently come into guiding relationship with one another at the diameter of the surfaces 116b″, 116c″ and finally at the diameter of the surfaces 114b″, 114c″.

Inside the forward end of the coupling body 60″ the annular channel or groove 99″ is bored in the cylindrical surface at the intermediate diameter 115c″ to receive and hold captive the composite locking ring structure comprising the arcuate segments 101″ and the square sectioned resilient split ring 100 as described in connection with Fig. 1. This ring channel is spaced from forward end face of the coupling part C″ and is located in a reduced or intermediate diameter portion of the coupling body so that in assembling the coupling the cylindrical surfaces of the coupling part B″ are slidable within the cylindrical surfaces of the coupling part C″ for the desired piloting and progressive stepwise centering action prior to cracking open of the internal fluid valves.

Each of the arcuate segments 101″ is formed with a circumferential rabbet or groove 120″ of L-shape and without the lip 133 previously mentioned so that the resilient split ring 100 engages the radial face of the hard steel square sectioned split ring insert 121″ as described in connection with Fig. 9, thereby providing flat bearing surface contact substantially continuous about the entire circumferential extent of the resilient lock ring structure. The lock ring segments 101″ have cylindrically curved inwardly directed surfaces that are flush with the cylindrical inner periphery of the square sectioned lock ring 100. The outer surfaces of the segments are exposed for engagement by inclined convexly curved cam surfaces 118″ that are formed on forward portions of the actuator sleeve ribs 119″ that lie in the slots between the body ribs 110. In movement of the actuator sleeve A″ from the retracted position to the locked position the inclined cam surfaces 118″ ride over the ring segments 101″ and effect contraction of the locking ring structure.

The forward movement of the actuator sleeve A″ does not cease at the completion of the radial contraction of the locking ring structure but continues after bottoming of one of the internal valves, to carry cylindrically curved portions 124″ of the internal faces of the ribs 119″ onto the segments 101″ of the locking structure. The cylindrical portions 124″ are depressed below crests 134″ of the cam surfaces in the provision of rounded detent shoulders on the ribs that engage the front faces or edge corners of the segments 101″ to resist reverse or retractive movement of the sleeve A″. By reason of the confining of the locking ring structure behind the detent crests 134′ and within the axial limits of the cylindrically curved internal surfaces of the actuator ribs, a positive locking of the parts is obtained. To effect a release it is necessary that the segments be withdrawn past the rounded detents 134″ by retracting or shifting the sleeve A″ to the right as viewed in the figures so as to clear the confining surfaces 124″ from about the locking ring structure.

The limit of movement of the actuator sleeve A″ in the forward or locking direction, to the left as viewed in Fig. 12, is determined by engagement between the forward ends of the ribs 119″ and the sloping shoulders 125 located in the grooves between the forward ends of the body ribs 110.

When the coupling of the present invention is in use on a line carrying fluid under high pressures of the order of several hundred pounds or more, such, for example, as are encountered in the lines supplying hydraulic equipment in aircraft, the axial forces exerted on the coupling parts by the pressurized fluid hold the lock rings 100, 121 (or 100′, 121′ or 100″, 121″) strongly against one another and the resulting frictional grip of one lock ring on the other is sufficient to prevent release of the interlock even though the coupling sleeve A (or A′ or A″) be withdrawn purposely or inadvertently to the retracted position in which the segments of the locking structure are unconfined. This feature, which prevents accidental disconnection of the coupling parts in use, particularly characterizes the embodiment of Figs. 12–14, wherein both the fixed ring 121″ and the expansible and contractible lock ring 100 are of square or rectangular cross section and have flat radial surfaces of substantial area in contact with one another. It is apparent, of course, that this self-locking feature by which the interlock is maintained when the actuating sleeve A (A′ or A″) is retracted can be enhanced by making the interlocking rings with sloping radial surfaces so that when the coupling is loaded one component of the normal force between the meeting surfaces of the rings acts to draw or hold the expansible ring in or toward the contracted interlock position. In the case of the embodiments employing a lock ring of circular section, the security of the interlock can be enhanced by forming a matching circular groove in the meeting surface of the companion lock ring so that the curved surface of the circular sectioned ring is seated in the annular groove in the interlocked position and the annular force pressing the rings together holds the one ring seated in the circular groove of the other, providing the detent connection which resists expansion of the locking ring necessary for release of the interlock.

By reason of the retention of the interlock through frictional engagement between the lock rings 100, 121, or their equivalents, it may be necessary when purposely disconnecting the coupling parts while under internal fluid pressure to force the coupling parts axially together so as to relieve the lock rings of the axial forces which press their meeting surfaces together. This is accomplished by the operator applying force to the body member 60 (60' or 60") after the sleeve A (A' or A") has been retracted. This axial force effects slight shifting together of the coupling parts and allows the resilient lock ring 100 (or equivalent) to expand the lock ring structure to its full diameter and clear the slot 102 and the fixed lock ring.

While the invention has been described by reference to a coupling employing interlocked outer tubular members and axially aligned internal stem members, it is apparent that certain of the features are useful in arrangements in which one or both of the stems 16, 63 are omitted. In an arrangement omitting the stem 16 and the barrel valve 32, the coupling part B is without the self-sealing feature. Nevertheless it is capable of effecting fluid tight connection with the coupling part C and the circular seal between the parts is established by the resilient annular seal 30 prior to the opening or displacing of the sleeve valve 72.

The present invention thus provides a push pull type of locking mechanism especially adapted for use in a self-sealing fluid coupling. The locking mechanism is of generally improved construction and design and is capable of withstanding fluid pressure surges and even conditions of vacuum or suction on the line without separating or breaking the circular seals between the bridging valve bodies and the coupling members. Although illustrated as an interlock for a coupling structure comprising tubular outer and axially aligned inner stem members bridged by valve bodies, it is contemplated that the invention provides sub-combination and structural features that can be used separately and to advantage in couplings of other types.

In accordance with the patent statutes the principles of the present invention may be utilized in various ways, numerous modifications and alterations being contemplated, substitution of parts and changes in construction being resorted to as desired, it being understood that the embodiments shown in the drawings and described above and the particular method set forth are given merely for purposes of explanation and illustration without intending to limit the scope of the claims to the specific details disclosed.

What I claim and desire to secure by Letters Patent of the United States is:

1. A locking coupling part for interlocking association with a companion coupling part, said locking part comprising a tubular body member formed with parallel axially extending external ribs, a sleeve movable axially over the body member, a split ring, a plurality of segmental elements slidingly related to the body member for radial shifting movement, the segmental elements and the split ring being interfitted as a locking structure arranged for contracting and expanding movements into and out of locking association with the companion coupling part, and ribs on the inside of the sleeve interfitted with the external ribs on the body member to splinely relate the sleeve and the body member, said sleeve ribs including inclined portions serving as cams engageable with the locking structure to shift the latter into said locking association upon axial movement of the sleeve relative to the body member.

2. A coupling part of the push pull type comprising a tubular body member formed with an internal socket opening through one end of the body member, the body member being also formed with an annular groove opening into the socket and having a radial thrust wall in a plane normal to the axis of the body member, a locking structure disposed in the groove, said locking structure being contractible to locking position and expansible to releasing position and having radial sliding engagement with the thrust wall in contracting and expanding, the body member being formed with a plurality of axial grooves extending across the annular groove and exposing circumferentially spaced points of the locking structure, each axial groove decreasing in radial depth progressively toward said one end of the body member from the annular groove whereby to effect gradual change in cross sectional area of the body member and to provide an integral annular portion surrounding the socket opening on said one end of the body member of greater cross section radially than elsewhere along such body member, and means carried by the body member for relative movement through the axial grooves for engagement with said locking structure points to deform such structure in effecting radial sliding of the latter on the thrust wall of the annular groove.

3. A locking coupling part for interlocking association with a companion coupling part, said locking part comprising a tubular body member having an internal socket opening through one end for receiving the spigot end of the companion part, the tubular body member being formed with a series of circumferentially spaced parallel external axial ribs, an annular groove formed in the tubular body member, said groove opening inwardly into and being continuous with the socket throughout the entire circumferential extent of the groove, the body being formed with a plurality of circumferentially spaced radial slot openings continuous with circumferentially spaced portions of the annular groove and also continuous with the spaces between the ribs of the tubular body member, the annular groove including other circumferentially spaced portions disposed radially inwardly of the axial ribs on the body, an expansible and contractible spring metal ring in the annular groove, a plurality of circumferentially elongated segments engaging the expansible ring at circumferentially spaced points, each of said segments having a radially thick portion extending radially outwardly through one of the slot openings and into one of the spaces between the body ribs and also having a radially thin portion extending circumferentially in the groove into one of said other groove portions, a sleeve embracing the tubular body member, said sleeve having a plurality of circumferentially spaced axially extending internal ribs received in the spaces between the ribs of the tubular body member, the sleeve ribs and the body ribs being interfitted in alternating relation permitting relative axial sliding movements while preventing relative rotative movements of the sleeve on the body, and the sleeve ribs and the radially thick portions of the segments being formed with coacting inclined plane means effecting contraction of the segments and the spring metal ring upon relative movement in one direction of the sleeve on the tubular body member and permitting expansion of the resilient ring and the segments carried thereby upon reverse relative movement of the sleeve on the tubular body member.

4. A locking coupling part for interlocking association with a companion coupling part, said locking part comprising a tubular body member having an internal socket opening through one end for receiving the spigot end of the companion part, an annular groove formed in the tubular body member, said groove opening inwardly into and being continuous with the socket throughout the entire circumferential extent of the groove, the body being formed with a plurality of circumferentially spaced radial slot openings continuous with the annular groove, an expansible and contractible spring metal ring in the annular groove, a plurality of circumferentially elongated segments engaging the expansible ring at circumferentially spaced points, each of said segments having one portion extending radially outwardly through one of the slot openings and another portion extending circumferentially in the groove beyond the one slot opening, and a sleeve embracing the tubular body member, said sleeve and the radially extending portions of the segments being formed with coacting inclined plane means effecting contraction of the segments and the spring metal ring upon relative movement in one direction of the sleeve on the tubular body member and permitting expansion of the resilient ring and the segments carried thereby upon reverse relative movement of the sleeve on the tubular body member.

5. A locking coupling part for interlocking association with a companion coupling part, said locking part comprising a tubular body member having an internal socket opening through one end for receiving the spigot end of the companion part, the tubular body member being formed with a series of circumferentially spaced parallel external axial ribs, an annular groove formed in the tubular body member, said groove opening inwardly into and being continuous with the socket throughout the entire circumferential extent of the groove, said groove dividing the tubular body into a forward guide portion which defines a forward portion of the internal socket immediately adjacent the socket opening and a rearward main portion which defines a rearward portion of the internal socket remote from the socket opening, the body being formed with a plurality of circumferentially spaced radial slot openings continuous with circumferentially spaced portions of the annular groove and also continuous with the spaces between the ribs of the tubular body member, the annular groove including other circumferentially spaced portions disposed radially inwardly of the axial ribs on the body, an expansible and contractible spring metal ring in the annular groove, a plurality of circumferentially elongated segments engaging the expansible ring at circumferentially spaced points, each of said segments having one portion extending outwardly through one of the slot openings and into one of the spaces between the body ribs and also having another portion extending circumferentially in the groove into one of said other groove portions, a sleeve embracing the tubular body member, said sleeve having a plurality of circumferentially spaced axially extending internal ribs received in the spaces between the ribs of the tubular body member, the sleeve ribs and the body ribs being interfitted in alternating relation permitting relative axial sliding movements while preventing relative rotative movements of the sleeve on the body, the sleeve ribs and the one portion of each of the segments being formed with coacting inclined plane means effecting contraction of the segments and the spring metal ring upon relative movement in one direction of the sleeve on the tubular body member and permitting expansion of the resilient ring and the segments carried thereby upon reverse relative movement of the sleeve on the tubular body member, and the portions of the tubular body member ribs disposed radially outwardly of the said other portions of the annular groove constituting the sole structural connections between the forward guide portion of the tubular body member and the rearward main portion of the body member.

6. A locking coupling part for interlocking association with a companion coupling part, said locking part comprising a tubular body member having an internal socket opening through one end for receiving the spigot end of the companion part, a circumferential groove in the tubular body member, said groove opening inwardly into and being continuous with the socket throughout the entire circumferential extent of the groove, the body being formed with a radial slot opening continuous with the circumferential groove but of less circumferential extent in the provision of groove portions spaced circumferentially from the radial slot, a T-shaped segment disposed in the groove with its central portion projecting through the radial slot and its end portions extending into the groove portions spaced from the slot whereby circumferential movement of the segment is limited by engagement of the central portion of the segment against the walls of the slot and radial outward movement of the segment is limited by engagement of the segment end portions against the bottom of the groove in said spaced groove portions, spring means biasing the segment outwardly, and a sleeve embracing the tubular body member, said sleeve and the projecting central portion of the segment being formed to coact in effecting radial inward movement of the segment upon relative movement of the sleeve axially along the tubular body member.

7. In a coupling assembly of the plug and socket type in which a plug part is received and interfitted telescopically within a socket part, a quick release locking structure for holding the coupling parts together in interfitted relation, said locking structure comprising means on one of the parts providing a circumferentially extending radial shoulder, the other part being formed with a circumferential groove having a radial thrust wall in a plane normal to the axis of the coupling, an arcuately curved lock element of spring metal disposed in the circumferential groove, a plurality of thrust elements interposed between the lock element and the radial thrust wall of the groove, lock actuator means carried by the said other coupling part for limited relative movement, means coacting between the lock actuator means and the thrust elements upon movement of the actuator means in one direction relative to the said other coupling part simultaneously to apply radial forces to the thrust elements, the thrust elements being formed to transmit such radial forces to the resilient lock element in effecting yielding deformation of the latter and effective to shift the thrust elements and the lock element radially from normal release positions into lock positions for engagement of the lock element with the radial shoulder on the one coupling part when the plug part is interfitted in the socket part, said lock element being arranged to directly contact and bear axially against the radial shoulder in resisting separation of the coupling parts, the thrust elements being separated from said radial shoulder by the lock element, axial thrust forces between the radial shoulder and the lock element in so resisting separation of the coupling parts being transmitted to the radial groove wall of said other coupling part wholly through the thrust elements, and said coacting means upon relative movement of the lock actuator means in another direction relative to the said other coupling part effecting release of the thrust elements for return of the thrust and lock elements to normal release positions by reason of the inherent resiliency of the spring lock element.

8. In a high pressure fluid coupling of readily separable parts, an inner part comprising a plug portion of circular section having a forward end for insertion into a companion coupling part, said plug portion being formed with an external circumferentially extending radial shoulder spaced axially from the plug end, an outer quick acting companion locking part for interfitting association with said inner part in assembly, said outer part comprising a tubular body member having an internal circular sectioned socked opening through its forward end to receive slidingly the plug portion of the inner part in assembly by relative axial movement, the body member being formed with a circumferentially extending channel opening internally into the socket and spaced axially from the forward end of the body member and with axially extending external ribs and grooves in generally parallel alternative relation, the channel also opening radially outwardly into the external grooves at points spaced circumferentially about the body member by the ribs, the channel dividing the body member into a ring portion at the forward end and a base portion for connection to a fluid conduit, the ribs being the sole connection between the ring and base portions of the body member and constituting bridges across the channel, arcuately curved spring means disposed in the channel and extending about substantially the entire circumference of such channel, the spring means being radially compressed in assembly and normally expanding to bear yieldingly against and be confined by the connecting bridges of the ribs, the channel having confronting axially spaced walls confining the spring means and being of sufficient radial depth to accommodate the expanded spring means in substantially completely recessed relation with respect to the internal socket for free movement of the plug portion of the inner coupling part into and out of the socket, a sleeve embracing the body member, a plurality of axially extending ribs on the inside of the sleeve in parallel relation, said ribs being received in the grooves between the ribs of the body member to guide the sleeve on the latter for relative axial rectilinear sliding movement and to resist relative rotation of the sleeve on the body member, the sleeve being so movable on the body member relatively forwardly to a locking position and in a reverse direction relatively rearwardly to a releasing position spaced axially and rearwardly from the locking position, the sleeve ribs being advanced across the spring means by the forward movement of the sleeve and being formed as cams to bear radially and progressively against the spring means at circumferentially spaced points of the latter and thereby effect gradual contraction of the spring means as the sleeve slides forward to project the spring means from the channel radially inwardly into the socket behind the circumferential shoulder on the received plug portion of the inner coupling part, whereby to lock the interfitted coupling parts against separation, the spring means expanding by inherent resiliency as the cam ribs are retracted across the spring means by rearward movement of the sleeve to retract the spring means radially into the channel and thereby release the plug portion of the inner coupling part, the forward sleeve movement being opposite in direction to the relative movement of the plug portion of the inner coupling part in assembly, and the rearward sleeve movement being opposite in direction to the relative movement of such plug portion in disassembly of the coupling parts, whereby assembly and disassembly is effected by one hand manipulation of the sleeve and outer coupling part.

9. In a high pressure fluid coupling of readily separable parts, an inner part comprising a plug portion of circular section having a forward end for insertion into a companion coupling part, said plug portion being formed with an external circumferetially extending radial shoulder spaced axially from the plug end, an outer quick acting companion locking part for interfitting association with said inner part in assembly, said outer part comprising a tubular body member having an internal circular sectioned socket opening through its forward end to receive slidingly the plug portion of the inner part in assembly by relative axial movement, the body member being formed with a circumferentially extending channel opening internally into the socket and spaced axially from the forward end of the body member and with axially extending external ribs and grooves in generally parallel alternating relation, the channel also opening radially outwardly into the external grooves at points spaced circumferentially about the body member by the ribs, the channel dividing the body member into a ring portion at the forward end and a base portion for connection to a fluid conduit, the ribs being the sole connection between the ring and base portions of the body member and constituting bridges across the channel, arcuately curved spring means disposed in the channel and extending about substantially the entire circumference of such channel, the spring means being radially compressed in assembly and normally expanding to bear yieldingly against and be confined by the connecting bridges of the ribs, the channel having confronting axially spaced wall confining the spring means and being of sufficient radial depth to accommodate the expanded spring means in substantially completely recessed relation with respect to the internal socket for free movement of the plug portion of the inner coupling part into and out of the socket, a sleeve embracing the body member, a plurality of axially extending ribs on the inside of the sleeve in parallel relation, said ribs being received in the grooves between the ribs of the body member to guide the sleeve on the latter for relative axial rectilinear sliding movement and to resist relative rotation of the sleeve on the body member, the sleeve being so movable on the body member relatively forwardly to a locking position and in a reverse direction relatively rearwardly to a releasing position, spaced axially and rearwardly from the locking position, the sleeve ribs having cam portions with surfaces inclined to the axis of the coupling and holding portions with surfaces substantially parallel to such axis, the surfaces of the holding portions extending as continuations of the surfaces of the cam portions, the forward movement of the sleeve advancing first the cam portions and then the holding portions of the sleeve ribs across the spring means to bear radially against circumferentially spaced points of and to progressively contract the spring means as the sleeve moves forward and in the locking position to hold the spring means contracted and projected from the channel radially inwardly into the socket behind the circumferential shoulder on the received plug portion of the inner coupling part, whereby to lock the interfitted coupling parts against separation, the spring means expanding by inherent resiliency as the cam ribs are retracted across the spring means by rearward movement of the sleeve to retract the spring means radially into the channel and thereby release the plug portion of the inner coupling part, the forward sleeve movement being opposite in direction to the relative movement of the plug portion of the inner coupling part in assembly, and the rearward sleeve movement being opposite in direction to the relative movement of such plug portion in disassembly of the coupling parts, whereby assembly and disassembly is effected by one hand manipulation of sleeve and outer coupling part.

10. In a high pressure fluid coupling of readily separable parts, an inner part comprising a plug portion of circular section having a forward end for insertion into a companion coupling part, said plug portion being formed with an external circumferentially extending radial shoulder spaced axially from the plug end, an outer quick acting companion locking part for interfitting association with said inner part in assembly, said outer part comprising a tubular body member having an internal circular sectioned socket opening through its forward end to receive slidingly the plug portion of the inner part in assembly by relative axial movement, the body member being formed with a circumferentially extending channel opening internally into the socket and spaced axially from the forward end of the body member, the body member also being formed with external radial projections and depressions alternating about the periphery of the body member, the channel also opening radially outwardly into the external radial depressions at points spaced circumferentially about the body member, the channel dividing the body member into a ring portion at the forward end and a base portion for connection to a fluid conduit, the external radial projections being the sole connection between the ring and base portions of the body member and constituting bridges across the channel, arcuately curved spring means disposed in the channel and extending about substantially the entire circumference of such channel, the spring means being radially compressed in assembly and normally expanding to bear yieldingly against and being confined by the connecting bridges, the channel having confronting axially spaced walls confining the spring means and being of sufficient radial depth to accommodate the expanded spring means in substantially completely recessed relation with respect to the internal socket for free movement of the plug portion of the inner coupling part into and out of the socket, a sleeve embracing the body member, the sleeve being movable on the body member relatively forwardly to a locking position and relatively rearwardly to a releasing position spaced axially and rearwardly from the locking position, a plurality of radial projections and depressions formed in alternating relation on the inside of the sleeve, the radial projections of the body member being received in the depressions of the sleeve and the radial projections of the sleeve being received in the depressions of the body member in interfitting relation to resist relative rotation and to guide the sleeve on the body member for relative axial rectilinear motion, the sleeve projections being advanced across the spring means by the forward movement of the sleeve, at least one of the said spring means and the sleeve projections being tapered to present sloping cam surface means to the other so that as the sleeve moves forward the sleeve projections bear radially against the spring means at circumferentially spaced points about the sleeve to thereby effect gradual contraction of the spring means as the sleeve slides forward and to thereby project the spring means from the channel radially inwardly into the socket behind the circumferential shoulder on the received plug portion of the inner coupling part, whereby to lock the interfitted coupling parts against separation, the spring means expanding by inherent resiliency as the sleeve projections are retracted across the spring means by rearward movement of the sleeve to retract the spring means radially into the channel and thereby release the plug portion of the inner coupling part, the forward sleeve movement being opposite in direction to the relative movement of the plug portion of the inner coupling part in assembly, and the rearward sleeve movement being opposite in direction to the relative movement of such plug portion in disassembly of the coupling parts, whereby assembly and disassembly is effected by one hand manipulation of the sleeve and outer coupling part.

11. In a high pressure fluid coupling of readily separable parts, an inner part comprising a plug portion of circular section having a forward end for insertion into a companion coupling part, said plug portion being formed with an external circumferentially extending radial shoulder spaced axially from the plug end, an outer quick acting companion locking part for interfitting association with said inner part in assembly, said outer part comprising a tubular body member having an internal circular sectioned socket opening through its forward end to receive slidingly the plug porton of the inner part in assembly by relative axial movement, the body member being formed with a circumferentially extending channel opening internally into the socket and spaced axially from the forward end of the body member, the body member also being formed with external radial projections and depressions alternating about the periphery of the body member, the channel also opening radially outwardly into the external radial depressions at points spaced circumferentially about the body member, the channel dividing the body member into a ring portion at the forward end and a base portion for connection to a fluid conduit, the external radial projections being the sole connection between the ring and the base portions of the body member and constituting bridges across the channel, arcuately curved spring means disposed in the channel and extending about substantially the entire circumference of such channel, the spring means being radially compressed in assembly and normally expanding to bear yieldingly against and being confined by the connecting bridges, the channel having confronting axially spaced walls confining the spring means and being of sufficient radial depth to accommodate the expanded spring means in substantially completely recessed relation with respect to the internal socket for free movement of the plug portion of the inner coupling part into and out of the socket, the spring means including elements projecting through the radial openings from the channel into the external depressions of the body member, a sleeve embracing the body member, the sleeve being movable on the body member relatively forwardly to a locking position and relatively rearwardly to a releasing position spaced axially and rearwardly from the locking position, means interposed between the sleeve and the projecting elements of the spring means and having connection with the sleeve to be actuated by the forward movement of the sleeve, at least one of the said spring means and the sleeve actuated means being tapered to present sloping cam surface means to the other so that as the sleeve moves forward the sleeve actuated means bears radially and progressively against the said elements of the spring means and thereby effects gradual circumferential contraction and radial inward projection of the spring means into the socket behind the circumferential shoulder on the plug portion of a received coupling part, whereby engagement of the contracted inwardly projecting spring means against such shoulder locks the parts against axial separation, said sleeve actuated means being retracted from the spring means by rearward movement of the sleeve to release the spring means, said spring means expanding by inherent resiliency as released to effect retraction of the spring means radially outwardly into the channel and thereby unlock the coupling parts, the forward sleeve movement being opposite in direction to the relative movement of the plug portion of the inner coupling part in assembly, and the rearward sleeve movement being opposite in direction to the relative movement of such plug portion in disassembly of the coupling parts, whereby assembly and disassembly is effected by one hand manipulation of the sleeve and outer coupling part.

12. In a high pressure fluid coupling of readily separable parts, an inner part comprising a plug portion of circular section having a forward end for insertion into a companion coupling part, said plug portion being formed with an external circumferentially extending radial shoulder spaced axially from the plug end, an outer quick acting companion locking part for interfitting association with said inner part in assembly, said outer part comprising a tubular body member having an internal circular sectioned socket opening through its forward end to receive slidingly the plug portion of the inner part in assembly by relative axial movement, the body member being formed with a circumferentially extending channel opening internally into the socket and spaced axially from the forward end of the body member, the body member also being formed with external radial projections and depressions alternating about the periphery of the body member, the channel also opening radially outwardly into the external radial depressions at points spaced circumferentially about the body member, the channel dividing the body member into a ring portion at the forward end and a base portion for connection to a fluid conduit, the external radial projections being the sole connection between the ring and base portions of the body member and constituting bridges across the channel, a plurality of segmental elements received in and distributed about the channel, the channel having confronting axially spaced parallel radial walls confining the segmental elements for sliding radial movement of the latter, resilient means biasing the segmental elements to expand radially and with such elements comprising spring means extending about substantially the entire circumference of the channel, the channel being of sufficient radial depth to accommodate the spring means substantially completely recessed into the body member with respect to the internal socket for free movement of the plug portion of the inner coupling part into and out of the socket, the elements each projecting through the radial openings from the channel into the external depressions of the body member, a sleeve embracing the body member, the sleeve being movable on the body member relatively forwardly to a locking position and relatively rearwardly to a releasing position spaced axially and rearwardly from the locking position, means interposed between the sleeve and the projecting elements of the spring means and having connection with the sleeve to be actuated by the forward movement of the sleeve, at least one of the said spring means and the sleeve actuated means being tapered to present sloping cam surface means to the other so that as the sleeve moves forward the sleeve actuated means bears radially and progressively against the said elements of the spring means and thereby effects gradual circumferential contraction and radial inward projection of the spring means into the socket behind the circumferential shoulder on the plug portion of a received coupling part, whereby engagement of the contracted inwardly projecting spring means against such shoulder locks the parts against axial separation, said sleeve actuated means being retracted from the spring means by rearward movement of the sleeve to release the spring means, said spring means expanding by inherent resiliency as released to effect retraction of the spring means radially outwardly into the channel and thereby unlock the coupling parts, the forward sleeve movement being opposite in direction to the relative movement of the plug portion of the inner coupling part in assembly, and the rearward sleeve movement being opposite in direction to the relative movement of such plug portion in disassembly of the coupling parts, whereby assembly and disassembly is effected by one hand manipulation of the sleeve and outer coupling part.

13. In a high pressure fluid coupling of readily separable parts, an inner part comprising a plug portion of circular section having a forward end for insertion into a companion coupling part, said plug portion being formed with an external circumferentially extending radial shoulder spaced axially from the plug end, an outer quick acting companion locking part for interfitting association with said inner part in assembly, said outer part comprising a tubular body member having an internal circular sectioned socket opening through its forward end to receive slidingly the plug portion of the inner part in assembly by relative axial movement, the body member being formed with a circumferentially extending channel opening internally into the socket and spaced axially from the forward end of the body member, the body member also being formed with external radial projections and depressions alternating about the periphery of the body member, the channel also opening radially outwardly into the external radial depressions at points spaced circumferentially about the body member, the channel dividing the body member into a ring portion at the forward end and a base portion for connection to a fluid conduit, the external radial projections being the sole connection between the ring and base portions of the body member and constituting bridges across the channel, a plurality of segmental elements received in and distributed about the channel, the channel having confronting axially spaced parallel radial walls confining the segmental elements for sliding radial movement of the latter, resilient means biasing the segmental elements to expand radially and with such elements comprising spring means extending about substantially the entire circumference of the channel, the channel being of sufficient radial depth to accommodate the spring means substantially completely recessed into the body member with respect to the internal socket for free movement of the plug portion of the inner coupling part into and out of the socket, the elements each projecting through the radial openings from the channel into the external depressions of the body member, a sleeve embracing the body member, and having a plurality of internal ribs paralleling the coupling axis, the sleeve being axially slidable on and relative to the body member between a forward locking position and a rearward releasing position, the internal ribs of the sleeve being interfitted with the body member to prevent relative rotation in all positions of the sleeve relative to the body member and to guide the sliding movement of the sleeve between locking and releasing positions, the sleeve ribs being advanced across the projecting elements of the spring means by the forward movement of the sleeve and being formed as tapered cams to bear radially and progressively against the projecting elements and effect gradual contraction of the spring means as the sleeve moves forward to project the spring means from the channel radially inwardly into the socket behind the circumferential shoulder on the received plug portion of the inner coupling part, whereby to lock the interfitted coupling parts against separation, the spring means expanding by inherent resiliency as the cam ribs are retracted across the spring means by rearward movement of the sleeve to retract the spring means radially into the channel and thereby release the plug portion of the inner coupling part, the forward sleeve movement being opposite in direction to the relative movement of the plug portion of the inner coupling part in the assembly, and the rearward sleeve movement being opposite in direction to the relative movement of such plug portion in disassembly of the coupling parts, whereby assembly and disassembly is effected by one hand manipulation of the sleeve and outer coupling part.

14. In a high pressure fluid coupling of readily separable parts, an inner part comprising a plug portion of circular section having a forward end for insertion into a companion coupling part, said plug portion being formed with an external circumferentially extending radial shoulder spaced axially from the plug end, an outer quick acting companion locking part for interfitting association with said inner part in assembly, said outer part comprising a tubular body member having an internal circular sectioned socket opening through its forward end to receive slidingly the plug portion of the inner part in assembly by relative axial movement, the body member being formed with a circumferentially extending channel opening internally into the socket and spaced axially from the forward end of the body member, the channel also opening radially outwardly through the body at points spaced circumferentially about the body, the channel dividing the body member into a ring portion at the forward end and a base portion for connection to a fluid conduit, portions of the body located between the radial openings of the channel being the sole connection between the ring and base portions of the body member and constituting bridges across the channel, a plurality of arcuately curved segmental elements received in and distributed uniformly about the channel circumferentially, a split spring ring assembled with and bearing against the segmental elements, the split ring being compressed in assembly and normally biasing the segmental elements to expand radially outwardly to project out the body through the outward radial openings of the channel, the channel having confronting axially spaced walls confining the segmental elements against axial shifting movements and for radial sliding movements, the channel being of sufficient radial depth to accommodate the expanded circumferential spring assembly of segmental elements and split ring in substantially completely recessed relation with respect to the internal socket for free movement of the plug portion of the inner coupling part into and out of the socket, a sleeve splined on the body member against relative rotation and for relative axial rectilinear movements forwardly to a locking position and rearwardly to a releasing position, a plurality of axially extending cams on the inside of the sleeve disposed to travel with the sleeve across the segmental elements projected through the outward channel openings and to bear radially against such elements, the cams having profiles effective progressively to force the segmental elements radially inwardly and thereby contract the circumferential split spring ring assembly as the sleeve is moved relatively forwardly on the body member to project such circumferential split spring ring assembly from the channel radially inwardly into the socket behind the circumferential shoulder on the received plug portion of the inner coupling part, whereby to lock the interfitted coupling parts against separation, the spring ring assembly expanding by inherent resiliency as the cams are retracted across the segmental elements by rearward relative movement of the sleeve to retract the spring ring assembly radially into the channel and thereby release the plug portion of the inner coupling part, the forward sleeve movement being opposite in direction to the relative movement of the plug portion of the inner coupling part in assembly, and the rearward sleeve movement being opposite in direction to the relative movement of such plug portion in disassembly of the coupling parts, whereby assembly and disassembly is effected by one hand manipulation of sleeve and outer coupling part.

15. In a high pressure fluid coupling as defined in claim 14 the combination in which the split spring ring is of rectangular radial section.

16. In a high pressure fluid coupling as defined in claim 11 the combination in which the forward end of the body member is surrounded by the sleeve in the locking position and the body and the sleeve have coplanar end faces whereby the positive locked condition of the coupling is readily ascertainable by visual inspection and also by feel.

17. In a high pressure fluid coupling as defined in claim 8 the combination in which the external grooves of the body member terminate short of the forward end of the body member in the provision of a circular forward end face on the body member having both inner and outer peripheries of uninterrupted circular configuration.

18. In a high pressure fluid coupling as defined in claim 8 the combination in which the external grooves of the body member diminish progressively in radial depth forwardly of the circumferential channel and terminate short of the forward end of the body member in the provision of a circular forward end face on the body member having both inner and outer peripheries of uninterrupted circular configuration.

19. In a high pressure fluid coupling as defined in claim 10 the combination in which the sleeve projections and the spring means are complementally formed to resist rearward movement of the sleeve from the forward locking position by radial yielding of the spring means whereby the spring means constitutes a detent holding the sleeve yieldingly in locking position.

References Cited in the file of this patent
UNITED STATES PATENTS

| | | |
|---|---|---|
| 1,509,651 | Iftiger | Sept. 23, 1924 |
| 1,574,922 | Nelson | Mar. 2, 1926 |
| 2,070,013 | Krannak | Feb. 9, 1937 |
| 2,280,786 | Boynton | Apr. 28, 1942 |
| 2,425,500 | Wiggins | Aug. 12, 1947 |
| 2,440,452 | Smith | Apr. 27, 1948 |
| 2,525,667 | Goolsbee | Oct. 10, 1950 |
| 2,623,399 | Barrett | Dec. 30, 1952 |
| 2,628,111 | Smalline | Feb. 10, 1953 |
| 2,727,761 | Elliott | Dec. 20, 1955 |

UNITED STATES PATENT OFFICE
CERTIFICATE OF CORRECTION

Patent No. 2,837,352                    June 3, 1958

Paul D. Wurzburger

It is hereby certified that error appears in the printed specification of the above numbered patent requiring correction and that the said Letters Patent should read as corrected below.

Column 8, line 2, for "etween" read -- between --; column 11, lines 16, 21, and 27, for "32'", each occurrence, read -- 32 --; column 13, line 17, for "or such" read -- of such --; column 14, line 22, for "134'" read -- 134" --; column 18, line 66, for "alternative" read -- alternating --; column 21, line 48, for "porton" read -- portion --; line 61, before "base" strike out "the"; column 25, line 21, for the claim reference numeral "11" read -- 10 --.

Signed and sealed this 19th day of January 1960.

(SEAL)

Attest:

KARL H. AXLINE
Attesting Officer

ROBERT C. WATSON
Commissioner of Patents